(12) United States Patent
Takahashi et al.

(10) Patent No.: US 6,505,005 B1
(45) Date of Patent: Jan. 7, 2003

(54) CAMERA WHICH IS PLEASING IN APPEARANCE, WHICH CAN BE EASILY ASSEMBLED, AND IN WHICH APPEARANCE PORTIONS SUCH AS A WINDOW FOR A RANGE-MEASURING UNIT ARE FIXED WITHOUT BEING DEFORMED

(75) Inventors: Keita Takahashi, Tsukui-gun (JP); Hiroyuki Ando, Hachioji (JP); Nobuyuki Tanaka, Hidaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/573,292

(22) Filed: May 18, 2000

(30) Foreign Application Priority Data

May 21, 1999 (JP) .......................................... 11-141493

(51) Int. Cl.[7] .......................... G03B 17/02; G03B 17/00
(52) U.S. Cl. ......................................... 396/535; 396/25
(58) Field of Search ................................ 396/6, 25, 26, 396/535

(56) References Cited

U.S. PATENT DOCUMENTS 4,714,333 A * 12/1987 Tamamura et al. ........... 396/29
5,028,943 A * 7/1991 Ishii et al. .................. 396/176
5,758,200 A * 5/1998 Inoue et al. .................. 396/25

FOREIGN PATENT DOCUMENTS

JP 7-218971 8/1995

* cited by examiner

Primary Examiner—Russell Adams
Assistant Examiner—Arthur A Smith
(74) Attorney, Agent, or Firm—Frishauf, Holtz, Goodman & Chick, P.C.

(57) ABSTRACT

To provide a camera in which the parts can be easily assembled, with appearance parts such as a window for a range-measuring unit fixed without being deformed, and which has preferably a-fine impression, the present invention proposes a camera comprising exterior parts for covering essential parts of a camera body, a first appearance part attached to the exterior parts, and a second appearance part attached to the exterior parts. The first appearance part is. arranged on the exterior parts and the second appearance part.

22 Claims, 3 Drawing Sheets

CAMERA WHICH IS PLEASING IN APPEARANCE, WHICH CAN BE EASILY ASSEMBLED, AND IN WHICH APPEARANCE PORTIONS SUCH AS A WINDOW FOR A RANGE-MEASURING UNIT ARE FIXED WITHOUT BEING DEFORMED

CROSS-REFERENCE TO RELATED APPLICATIONS

This application is based upon and claims the benefit of priority from the prior Japanese Patent Application No. 11-141493, filed May 21, 1999, the entire contents of which are incorporated herein by reference.

BACKGROUND OF THE INVENTION

The present invention relates to a camera in which a luminous sensor unit and the like are built and more particularly to a parts structure therefor.

Recently, structures of appearance parts and exterior parts that are exposed to the outside of a camera have been improved so as not to uglify the appearance of the camera. For example, a camera which comprises a luminous sensor section provided inside a camera casing to sense the amount of light in a subject area and in which an aperture diaphragm for limiting the amount of light incident on the luminous sensor section is provided integrally with the camera casing, is disclosed in Jpn. Pat. Appln. KOKAI Publication No. 7-218971. In this camera, the integral structure is realized by providing what is called a "window for a range-measuring unit" serving as a part of the casing on the front surface of the luminous sensor section.

The window for a range-measuring unit of such a conventional camera is attached onto the front surface of the exterior parts of the camera by, for example, bonding or the ultrasonic welding.

Generally, when the window for a range-measuring unit as a part of the exterior part is fixed by bonding, much attention needs to be paid so as not to uglify the appearance by extrusion of an adhesive and the like. In addition, a sufficient time to connect the bonded portions to one another is necessary until the adhesive is cured, i.e. the time required for the work is inclined to be longer and, for this reason, manufacturing costs of the camera are increased.

Further, when the adhesive is applied to a waterproof camera, the entire periphery of the attached portions needs to be bonded in a watertight condition. This work is more difficult and thereby requires more manufacturing costs.

On the other hand, according to the method using the ultrasonic welding, a fine impression of the appearance can be kept as compared with the fixing by the bonding, but the ultrasonically welded portion may be thermally deformed during the work. For example, if the window for a range-measuring unit is ultrasonically welded and consequently deformed, a bad influence may be given to the accuracy in the range measurement.

If the viewfinder window is ultrasonically welded on the casing, deformation of the viewfinder window deteriorates the view in the viewfinder.

The object of the present invention is to provide a camera preferable in appearance, which can be simply assembled and in which the appearance portions such as the window for a range-measuring unit are fixed without deformed.

BRIEF SUMMARY OF THE INVENTION

The present invention is accomplished in consideration of the above-described circumstances. To solve the above problems and achieve the object, the present invention takes the following measures.

The first invention proposes a camera comprising an exterior part for covering a camera body, a first appearance part attached to the exterior part and a second appearance part attached to the exterior part. The first appearance part is arranged between the exterior part and the second appearance part.

The second invention proposes a camera comprising an exterior part for covering a camera body, a first appearance part fixed by bonding on the exterior part, and a second appearance part attached to the exterior part. The second appearance part covers a bonding part that bonds the first appearance part to the exterior part.

Further, the third invention provides a camera comprising an exterior part for covering a camera body, a first part attached to the exterior part, a waterproof part for keeping a watertight condition between the exterior part and the first part, and a second part attached to the exterior part. The first part and the waterproof part are sandwiched between the second part and the exterior part.

The "appearance part" used here is a part attached to the exterior part of the camera to form the appearance of the camera. The wording almost indicates a part exposed to the outside.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The gist of the present invention will be explained in detail by citing plural embodiments thereof.

Figure 1:
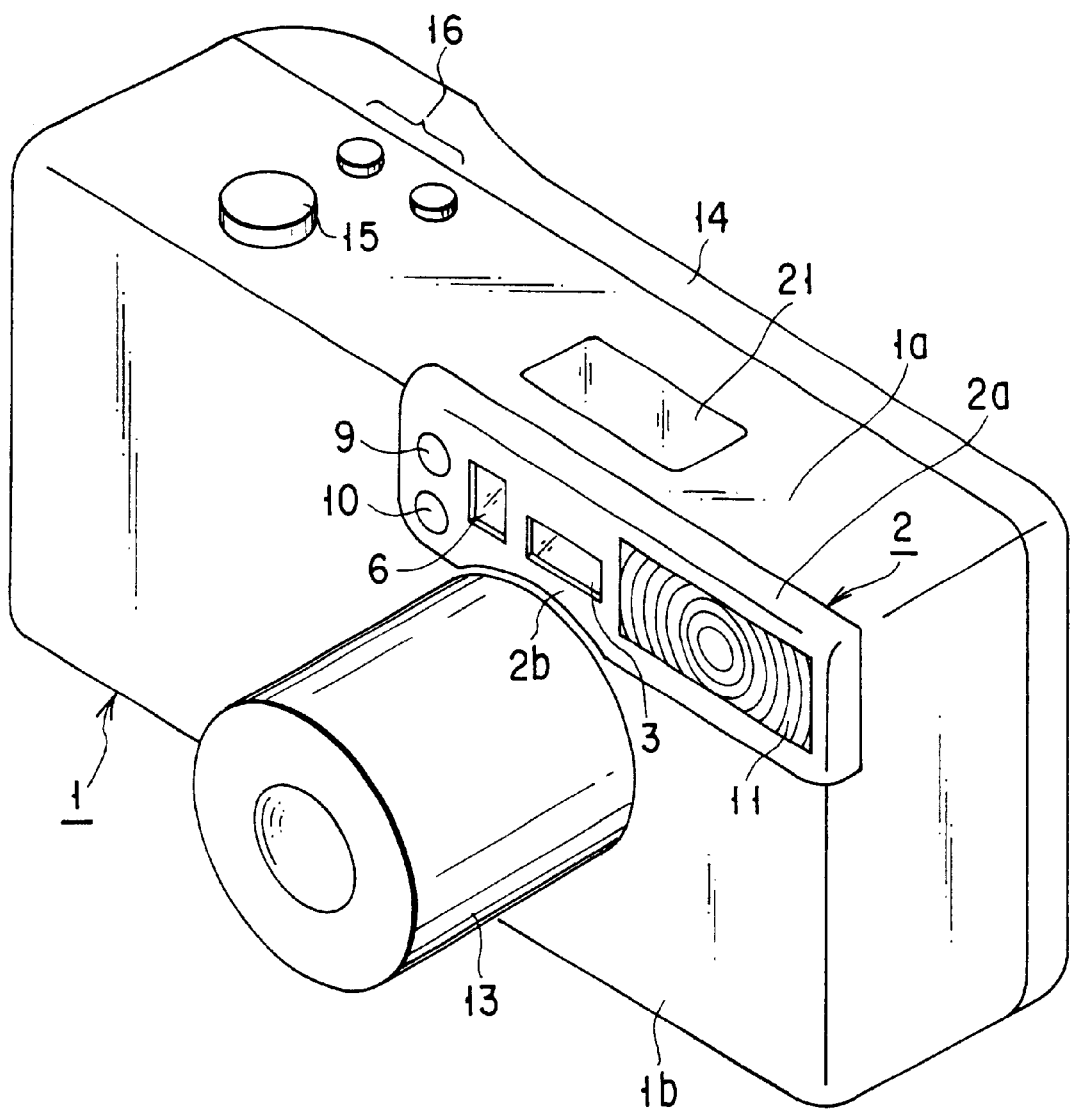
FIG. 1 is a perspective view showing an appearance of a camera according to the present invention.

FIG. 1 is a perspective view showing an appearance of a camera of a simplified type according to the present invention common to the plural embodiments. In this camera as shown in this figure, a front cover 1 and a rear cover 14 are assembled integrally to form a casing (a body) while containing major parts. A release button 15, a group of various operation buttons 16 and, for example, a liquid-crystal display panel 21 are provided on a top surface portion 1a of the front cover 1.

On the other hand, a lens barrel frame unit 13 is provided on a front surface portion 1b of the front cover 1 so as to be able to protrude therefrom. A plurality of rectangular or circular openings are formed and a front panel 2 serving as an integral unit panel is also provided between the lens barrel frame unit 13 and the display panel 21. A window 3 for a range-measuring unit having a range-measuring unit (an AF module 5) to be described later at the back, a viewfinder window 6 having a viewfinder system at the back, an AE window 9 having an AE unit at the back, a remote control window 10 having a light emitting/receiving unit for the remote control at the back, and a flash window 11 having a flash unit at the back, are arranged on the front panel 2 as shown in the figure.

The units are generally mounted integrally and closely in the camera body so that the range-measuring unit can detect a focus on a subject through the window 3 for a range-measuring unit and the viewfinder system can observe the subject through the viewfinder window 6.

The front cover 1 is substantially shaped in a box with the top surface portion 1a, the lower surface portion 1b, side surface portions and a bottom surface portion (not shown). The front cover 1 is combined with the rear cover 14 to constitute the exterior parts of the camera. The major parts such as electrical parts of the camera are safely covered with the front cover 1 and the rear cover 14 serving as the exterior parts. At this time, the front panel 1, and the window 3 for a range-measuring unit, viewfinder window 6, AE window 9, remote control window 10 and flash window 11 that are bonded to the front cover 1, constitute the parts of the exterior of the camera as the appearance parts.

The window 3 for a range-measuring unit, viewfinder window 6, AE window 9, and remote control window 10 are, for example, thin parallel flat plates formed of a transparent and colorless material. The flash window 11 is a single thin optical panel on which a Fresnel lens attached to the front panel 2 (2a, 2b) is provided. The surface shape of the flash window 11 is designed as shown in the figure to obtain the desired light distribution characteristics of the flash device.

One of the structural characteristics of the camera of the present invention is to have the exterior part (the front cover 1), the first appearance part (the window 3 for a range-measuring unit or the viewfinder window 6) attached to the exterior part, and the second appearance part (the front panel 2) attached to the exterior part. The first appearance part is sandwiched between the exterior part and the second appearance part. The second appearance part (the front panel 2) covers a bonding part, which bonds the first appearance part to the exterior part.

The characteristics of the first and second embodiments will be explained below in detail.

(First Embodiment)

Figure 2:
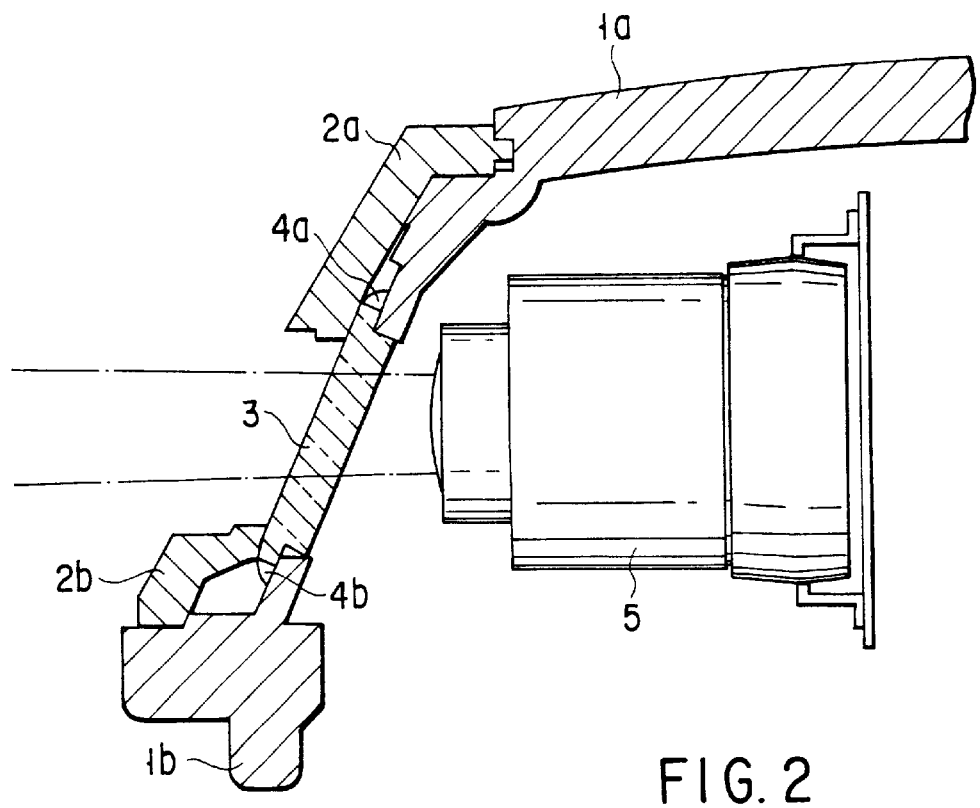
FIG. 2 is a vertically sectional view showing the parts of the camera including a range-measuring part according to a first embodiment of the present invention.

FIG. 2 is a vertically sectional view showing the parts of the camera including the range-measuring part according to the first embodiment of the present invention.

The AF module 5 is arranged in the camera so as to extend its optical axis toward the front side (toward the left side). This AF module 5 is what is called a known "passive" range-measuring device for measuring the range to the subject in accordance with the output of a photoelectric conversion element (not shown), and is fixed on the camera body.

In the structure as shown in the figure, the top surface portion 1a and the lower surface portion 1b of the front cover 1 serving as the exterior parts joint the step-shaped upper and lower peripheral parts of the window 3 for a range-measuring unit and their upper and lower edge portions are bonded. A protruding edge portion of the front panel 2a is fitted in a groove of a recess part of the top surface portion 1a of the front cover 1. The front panel 2b abuts on a step part of the lower surface portion 1b of the front cover 1. Inner surfaces of the other edges of the front panels 2a and 2b abut on the upper and lower edge portions of the front surface of the window 3 for a range-measuring unit so as to press them.

In the present embodiment, the covers 1a and 1b and the front panel 2 except the various windows 3, 6, 9 and 10 are produced of a material which does not allow to pass therethrough. It is thus understood that the window 3 for a range-measuring unit is bonded to the front cover 1 (1a, 1b) and the periphery of the bonding parts is covered with the front panel 2 (2a, 2b) in the exterior structure of the camera of this kind.

When the adhesive 4 is applied to the bonding parts 4a and 4b in the assembling step, the overall peripheral part of the window 3 for a range-measuring unit is bonded to the front cover 1 by the adhesive 4 so as to be watertight. The bonding parts 4a and 4b are covered with the front panel 2 and, therefore, cannot be seen in the appearance after the assembling has been completed. The adhesive 4 is a waterproof adhesive for bonding the window 3 for a range-measuring unit and the front cover 1 so as to be watertight. In the present embodiment, a silicon adhesive is used as an example of the adhesive.

(Advantage 1)

When the attachment part including the bonding parts 4a and 4b of the window 3 for a range-measuring unit is constituted and assembled to be covered with the front panel 2 (2a, 2b), the following advantage can be obtained. First, the bonding parts 4a and 4b are covered with the front panel 2 and, therefore, they cannot be seen from the outside, and a fine impression of the appearance is not thereby spoiled.

The window 3 for a range-measuring unit is fixed to the front cover 1 by bonding. Therefore, it is not thermally deformed as seen in the case of ultrasonic welding, and the original accuracy in the range measurement of the range-measuring unit 5 can be kept. Thus, the camera can be easily assembled, the attached appearance parts such as the window 3 for a range-measuring unit can be fixed without being deformed, no bad influence is given to the characteristics of the range measurement, and a fine impression on the front surface of the camera becomes preferable.

(Second Embodiment)

Another characteristic of the camera of the present invention is a structure having the exterior part (the front cover 1) covering the camera body, the first part (the window 3 for a range-measuring unit or the viewfinder window 6) attached to the exterior part, the waterproof part (for example, an O-ring 7 in FIG. 3) for keeping the watertight condition between the exterior part and the first part and the second part (the front panel 2) attached to the exterior part, and also having the first part and the waterproof part sandwiched between the second part and the exterior part. The second embodiment will be explained below in detail.

Figure 3:
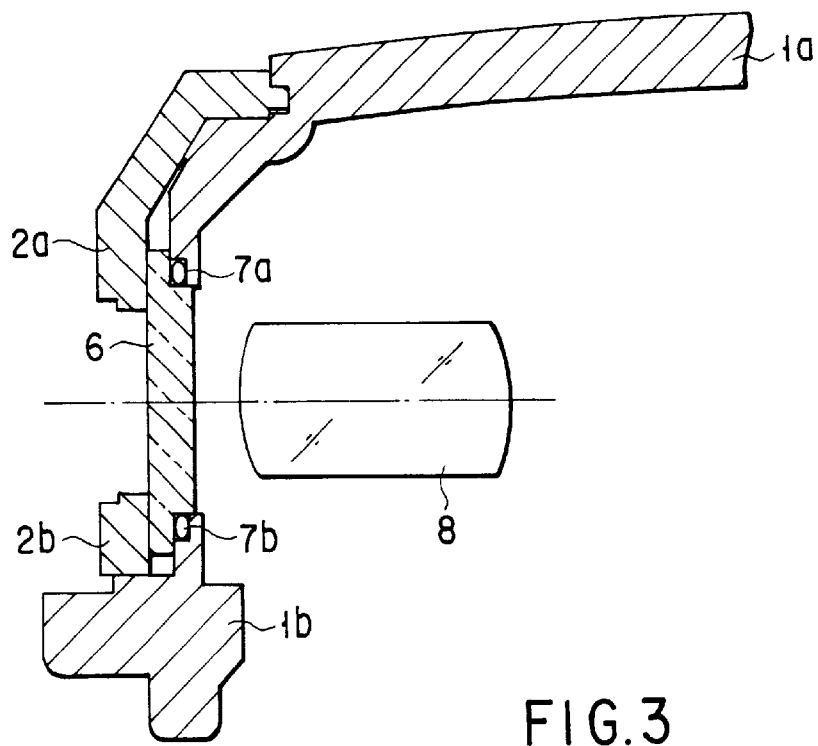
FIG. 3 is a vertically sectional view showing the parts of the camera including a viewfinder system according to a second embodiment of the present invention.

FIG. 3 is a vertically sectional view showing the structure of the parts of the camera including the viewfinder system according to the second embodiment of the present invention.

The structure of the parts of the above-explained first embodiment can be also applied to the parts including the viewfinder system. That is, a viewfinder unit 8 including the viewfinder optical system is arranged inside the camera so that an optical axis thereof extends toward the front side (i.e. the left side), and is fixed at the camera body side. As for the viewfinder unit 8 shown in the figure, a lens group of the viewfinder device for confirming the shooting range is pictorially described. The shooting range can be confirmed by looking through the viewfinder.

The O-ring 7 (7a, 7b) is arranged between the viewfinder window 6 and the front cover 1. The O-ring 7 is sandwiched in a gap between the step-shaped edge portion of the front covers 1a, 1b and the step-shaped peripheral edge portion of the viewfinder window 6 as shown in the figure.

Further, the protruding end part of the upper surface portion 2a of the front panel 2 is fitted in the recess part of the front cover 1a. Thus, the lower surface portion 2b thereof also abuts on the viewfinder window 6 by pressure.

The viewfinder window 6 is a parallel flat plate that is sandwiched between the opening peripheral edge of the front cover 1 and the inner surface of the front panel 2 (2a, 2b), and which is produced of a transparent and colorless material. The flat plate is arranged optically perpendicularly to the optical axis of the viewfinder system.

The O-ring 7 adopted here is an annular part composed of an elastic material such as nitrile rubber and silicon rubber. The ring adheres closely to the front cover 1 and the viewfinder 6 so as to be deformed therebetween at a predetermined amount, and keeps the watertightness between the viewfinder window 6 and the front cover 1.

The front panel 2 is attached to the opening peripheral edge of the front cover 1 and is fixed on the front cover 1 at a position which allows the O-ring 7 to be deformed.

The O-ring 7 formed of an elastic material is attached to be deformed at a predetermined amount. Therefore, the viewfinder window 6 abuts closely on the front panel 2 by the restoring force of the O-ring 7 between the front cover 1 and the front panel 2. If the outer diameter of the ring is set so that the ring can be easily fitted to the front cover 1, they are mutually fixed and are not detached.

(Advantage 2)

The following advantage can be obtained by constituting the attaching part (the connecting part) of the viewfinder window 6 as explained above.

First, the viewfinder window 6 can be quickly fixed to the front cover 1 so as to be watertight without applying an adhesive for the connection, by using the O-ring 7 of the elastic material as the connecting part between the front cover 1 and the viewfinder window 6. Thus, the workability of the assembling process can be improved. In addition, the watertight condition is not generated by the bonding, which is an unstable work, and therefore, water leakage resulting from the pin hole of threw adhesive does not occur.

For this reason, the assembling time can be shortened, the quality can be kept and the manufacturing costs can be reduced. In addition, the fixing method using the ultrasonic welding as seen in the prior art is not employed as the method of connecting the parts and, therefore, the viewfinder window 6 is not welded or deformed. Thus the viewfinder window 6 does not warp and can provide viewfinder images in the clean field of view.

The front panel 2 (2a, 2b) covers the connecting parts thereof and the O-ring 7 at a position where they are not seen from the outside. Therefore, a fine impression on the front surface of the camera is not spoiled.

Thus, the parts can be easily assembled, the attached exterior parts such as the viewfinder window 6 can be fixed without being deformed, the field of view in the viewfinder is not distorted, and a fine impression of the appearance becomes preferable.

(Third Embodiment)

Figure 4:
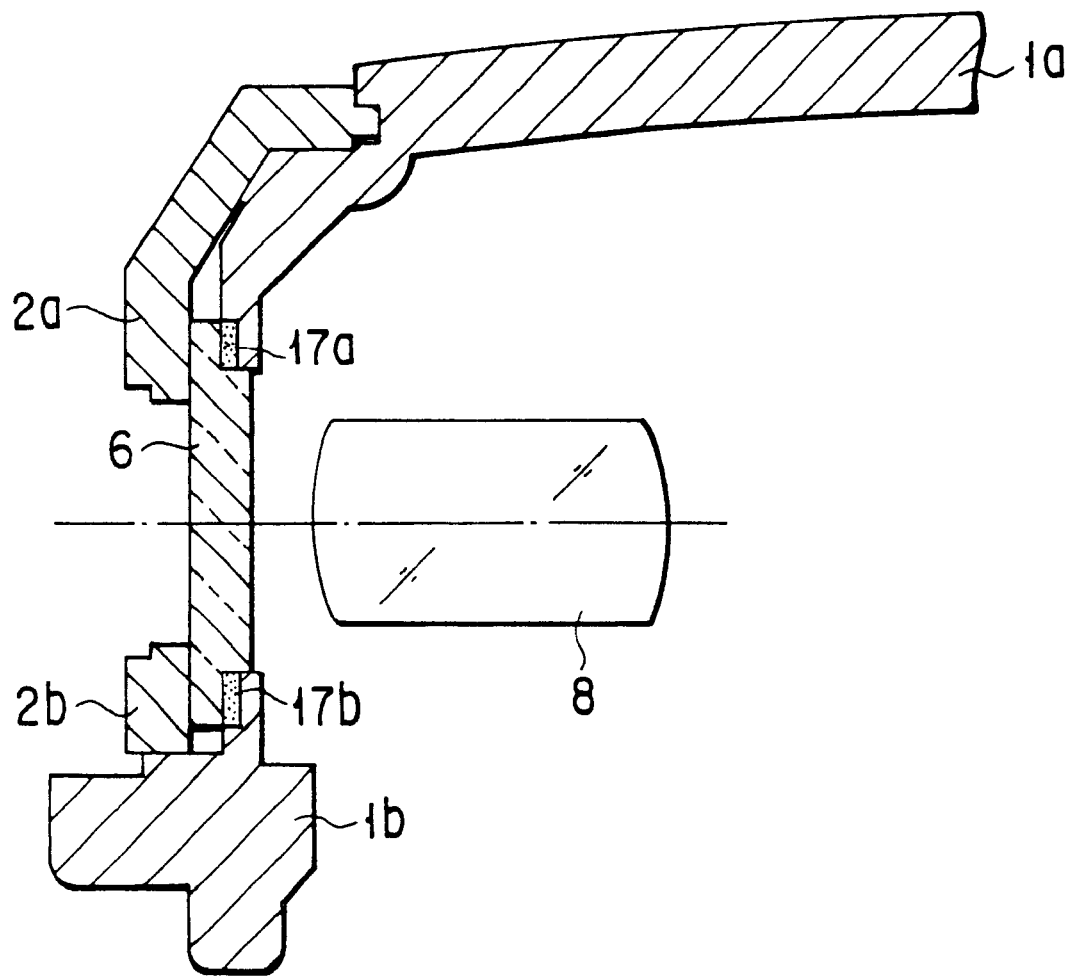
FIG. 4 is a vertically sectional view showing a structure of parts including a viewfinder system according to a camera using an adhesive tape as a waterproof part.

FIG. 4 is a vertically sectional view showing a structure of parts including a viewfinder system according to a camera using an adhesive tape as a waterproof part.

The viewfinder window 6 is firmly fixed to the periphery of the opening provided on the front cover 1 by a double-faced adhesive tape 17 (17a, 17b) so as to cover the front surface (the left side in the figure) of the viewfinder unit 8, similarly to the above-explained embodiment of FIG. 3. An adhesive tape having water-resistance as the adhesive tape 17 so that the viewfinder window 6 and the front cover 1 are firmly fixed in a watertight condition. The front panel 2 (2a, 2b) having an opening portion that can cover an attachment part using the adhesive tape 17 and expose the viewfinder window 6 is fixed to the front cover 1.

(Advantage 3)

In this structure the viewfinder window 6 is fixed to the front cover 1 by the double-faced tape 17 and the watertight condition is thereby kept between both the parts as compared with the second embodiment. Therefore, the viewfinder window 6 is not detached from the front cover 1 even before the front cover 2 is attached to the front cover 1, and thus, the workability in the assembling process becomes preferable.

For this reason, the assembling time can be shortened, the quality can be kept and the manufacturing costs can be reduced. In addition, the fixing method using the ultrasonic welding as seen in the prior art is not employed as the method of connecting the parts and, therefore, the viewfinder window 6 is not welded or deformed. Thus the viewfinder window 6 does not warp and can provide viewfinder images in the clean field of view.

The front panel 2 (2a, 2b) covers the connecting parts thereof and the adhesive tape 17 at a position where they are not seen from the outside. Therefore, a fine impression on the front surface of the camera is not spoiled.

Thus, the parts can be easily assembled, the attached exterior parts such as the viewfinder window 6 can be fixed without being deformed, the field of view in the viewfinder is not distorted, and a fine impression of the appearance becomes preferable.

(Other Modified Embodiment)

The parts that can employ the above explained parts structure are not limited to the window 3 for a range-measuring unit or the viewfinder window 6. The structure can also be applied to the AE window 9, the remote control window 10 and the flash window 11. Thus, the advantage that is equivalent to or superior to the advantages of the above-explained embodiments can be expected.

The present invention can be variously modified within a range that does not exceed the gist of the present invention.

The embodiments have been explained above, and the present specification discloses the following inventions:

(1) There is provided a camera comprising a front cover as an exterior part, a transparent window part as a first appearance part attached to the exterior part, and a front panel as a second appearance part attached to the exterior part, wherein the first appearance part is sandwiched between the exterior part and the second appearance part and the second appearance part is arranged so as to cover a bonding part that bonds the first appearance part to the exterior part.

(2) The first appearance part according to the invention (1) is a light-transmitting window part that is employed as at least one of a viewfinder window, an AE window, a remote control window and a flash window of the camera.

(3) There is provided a camera comprising a front cover as an exterior part, a transparent window part as a first part attached to the exterior part, and a front panel as a second part attached to the exterior part, wherein the camera further comprises an annular elastic part or an adhesive as a waterproof part between the exterior part and the first part and the waterproof part is sandwiched between the second part and the exterior part while keeping the watertight condition therebetween.

(4) The waterproof part according to the invention (2) is an O-ring that is deformed and closely applied by the pressure of the mutually bonded parts, or a silicon-based adhesive. A double-faced adhesive tape may be used as the waterproof part.

(Advantage of the Invention)

According to the present invention, the camera can be easily assembled, and the appearance parts such as the window for a range-measuring unit attached to the camera casing is not deformed. The present invention is also a method of fixing the appearance parts that can also be applied to a camera having a thin casing, and a camera preferably having a fine impression can be thereby provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   an exterior member covering a camera body;
   a first appearance member attached to an appearance side of the exterior member; and
   a second appearance member comprising an opening portion provided at a position corresponding to the first appearance member, a shielding portion covering a peripheral portion including an outermost edge portion of the first appearance member, and an attachment portion formed to project over an outermost shape of the first appearance member;
   wherein the second appearance member is attached to the exterior member at the attachment portion, the first appearance member is arranged between the exterior member and the second appearance member and is exposed to the outside through the opening portion of the second appearance member, and the peripheral portion of the first appearance member is shielded by the shielding portion of the second appearance member.

2. A camera according to claim 1, wherein the first appearance member is transparent.

3. A camera according to claim 1, wherein the first appearance member is arranged to cover an optical element part of the camera.

4. A camera comprising:
   an exterior member covering a camera body;
   a first appearance member attached to an appearance side of the exterior member and fixed by bonding on the exterior member at a peripheral end portion of the exterior member; and
   a second appearance member comprising an opening portion provided to expose the first appearance member, a shielding portion covering a bonding portion between the first appearance member and the exterior member, and an attachment portion formed to project over an outermost shape of the first appearance member;
   wherein the second appearance member is attached to the exterior member at the attachment portion, the first appearance member is arranged between the exterior member and the second appearance member, and a predetermined amount of space is provided between the second appearance member and the exterior member to arrange the bonding portion therebetween while the first and second appearance members are attached to the exterior member.

5. A camera according to claim 4, wherein the first appearance member and the exterior member are bonded so as to be watertight.

6. A camera according to claim 4, wherein the first appearance member is transparent.

7. A camera according to claim 4, wherein the first appearance member is arranged to cover an optical element part of the camera.

8. A camera according to claim 7, wherein the optical element part comprises at least any one of a viewfinder part, a range-measuring unit part, a luminous sensor unit part, a flash part and a remote controller part.

9. A camera according to claim 4, wherein the camera further comprises a flash unit, and the first appearance member closes an opening of the flash unit and adjusts distribution of light from the flash unit.

10. A camera according to claim 9, wherein a Fresnel lens is provided on the first appearance member.

11. A camera comprising:
    an exterior member covering a camera body;
    a first appearance member attached to an appearance side of the exterior member;
    a waterproof member for keeping a watertight condition between the exterior member and the first appearance member; and
    a second appearance member comprising an opening portion provided to expose the first appearance member, a shielding portion covering the waterproof member between the first appearance member and the exterior member, and an attachment portion formed to project over an outermost shape of the first appearance member;
    wherein the second appearance member is attached to the exterior member at the attachment portion, the first appearance member and the waterproof member are sandwiched between the second appearance member and the exterior member, the first appearance member is exposed to the outside through the opening portion of the second appearance member, and the waterproof member is shielded by the shielding portion of the second appearance member.

12. A camera according to claim 11, wherein the waterproof member comprises a double-faced tape.

13. A camera according to claim 11, wherein the waterproof part comprises an elastic part, and is arranged between the first appearance member and the exterior member in an elastically deformed condition.

14. A camera according to claim 13, wherein the elastic part comprises rubber.

15. A camera according to claim 11, wherein the first appearance member is transparent.

16. A camera according to claim 15, wherein the first appearance member is arranged to cover an optical element part of the camera.

17. A camera according to claim 16, wherein the optical element part comprises at least any one of a viewfinder part, a range-measuring unit part, a luminous sensor unit part, a flash part and a remote controller part.

18. A camera according to claim 15, wherein the camera further comprises a flash unit, and the first appearance member closes an opening of the flash unit and adjusts distribution of light from the flash unit.

19. A camera according to claim 18, wherein a Fresnel lens is provided on the first appearance member.

20. A camera comprising:

an exterior member covering a camera body, said exterior member comprising an engaging hole portion and an attachment position determining portion formed around the engaging hole portion;

a first appearance member comprising an engagement portion for engaging with the engaging hole portion of the exterior member and an abutment portion extending from the engagement portion to abut on the attachment position determining portion of the exterior member, said first appearance member being attached to an appearance side of the exterior member to engage with the engaging hole portion of the exterior member as an optical panel; and a second appearance member comprising an opening portion that is smaller than the engaging hole portion of the exterior member and that is provided to expose the first appearance member, a shielding portion for covering the attachment position determining portion of the exterior member, and an attachment portion formed to project over an outermost shape of the first appearance member;

wherein the second appearance member is attached to the exterior member at the attachment portion, the first appearance member is arranged between the exterior member and the second appearance member and is exposed to the outside through the opening portion of the second appearance member, and a peripheral portion including an outermost edge of the first appearance member is shielded by the shielding portion of the second appearance member such that the attachment position determining portion of the exterior member cannot visually be recognized.

21. A camera according to claim 20, wherein the first appearance member is fixed by bonding on the exterior member and a bonding portion is covered by the shielding portion of the second appearance member.

22. A camera according to claim 20, wherein the camera includes a waterproof member comprising an elastic member arranged between the attachment position determining portion of the exterior member and the abutment portion of the first appearance member; and the waterproof member is compressed between the attachment position determining portion and the abutment portion by attaching the second appearance member to the exterior member so as to make an interval between the attachment position determining portion and the abutment portion watertight.

* * * * *